United States Patent [19]

Rhoton et al.

[11] Patent Number: 4,860,485

[45] Date of Patent: Aug. 29, 1989

[54] DETACHABLE TIP FOR FISHING ROD

[75] Inventors: William L. Rhoton, 39260 W.C.R. 68, Briggsdale, Colo. 80611; Gary M. Sabell, Northglenn, Colo.

[73] Assignee: William L. Rhoton, Briggsdale, Colo.

[21] Appl. No.: 299,035

[22] Filed: Jan. 23, 1989

Related U.S. Application Data

[63] Continuation-in-part of Ser. No. 136,104, Dec. 21, 1987, which is a continuation-in-part of Ser. No. 906,929, Sep. 15, 1986, abandoned.

[51] Int. Cl.$^4$ ............................................. A01K 87/00
[52] U.S. Cl. ......................................... 43/24; 43/18.1
[58] Field of Search ........................... 43/18.1, 24, 25; 403/227, 372, 5

[56] References Cited

U.S. PATENT DOCUMENTS

| | | | |
|---|---|---|---|
| 2,367,088 | 1/1945 | Benson | 403/227 |
| 2,520,375 | 8/1950 | Roe | 403/372 |
| 3,861,815 | 1/1975 | Landaeus | 403/227 |
| 3,876,320 | 4/1975 | Phillipson | 403/372 |
| 4,067,133 | 1/1978 | Livingston | 43/18.1 |
| 4,632,591 | 12/1986 | Fullenkamp | 403/227 |
| 4,716,674 | 1/1988 | Kammeraad | 403/227 |

FOREIGN PATENT DOCUMENTS

| | | | |
|---|---|---|---|
| 567513 | 5/1958 | Belgium | 403/227 |
| 446347 | 3/1949 | Italy | 403/227 |
| 1030432 | 5/1966 | United Kingdom | 403/372 |

*Primary Examiner*—Kurt Rowan
*Attorney, Agent, or Firm*—Dean P. Edmundson

[57] ABSTRACT

A detachable tip for use on a conventional fishing rod section (e.g., a base section). The tip is useful, for example, in converting the fishing rod base section to an ice fishing pole. It may also be used as a repair item when the outer tip section of a fishing pole breaks. The detachable tip comprises a resiliently, highly flexible shaft having a length in the range of about 4 to 10 inches. One end of the shaft includes attachment means for detachably securing the tip to the fishing rod base section. The opposite end includes an eyelet or guide for the fishing line. Preferably the tip is made of plastic, as a molded item.

13 Claims, 1 Drawing Sheet

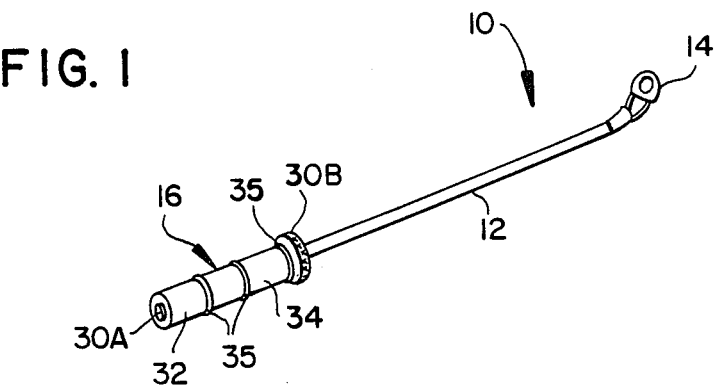
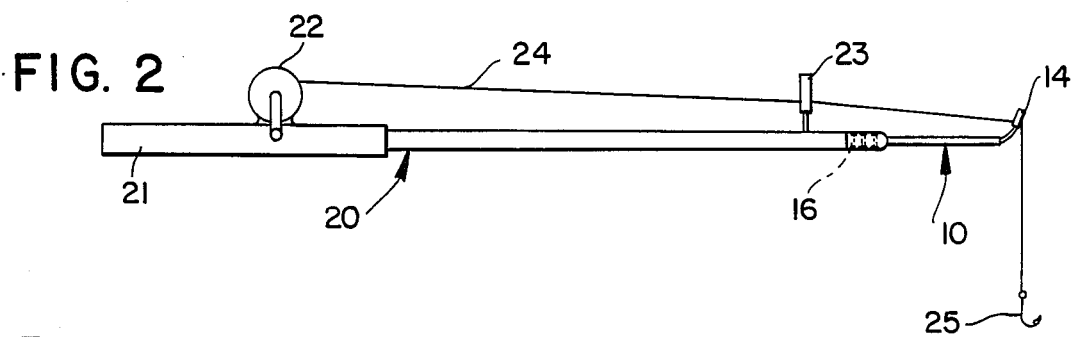
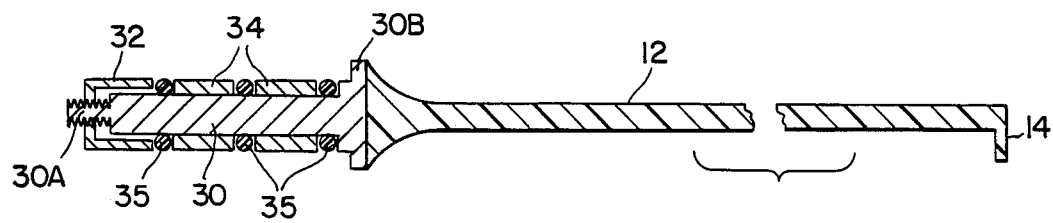
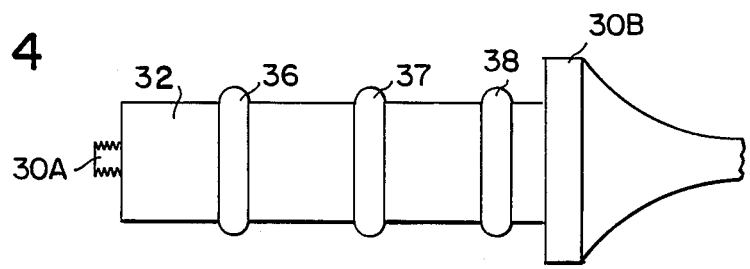
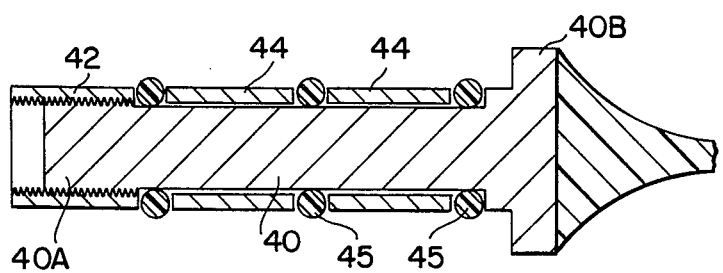

DETACHABLE TIP FOR FISHING ROD

CROSS-REFERENCE TO RELATED APPLICATIONS

This application is a continuation-in-part of our copending application Ser. No. 136,104, filed Dec. 21, 1987, which was a continuation-in-part of our copending application Ser. No. 906,929 filed Sept. 15, 1986, now abandoned.

FIELD OF THE INVENTION

This invention relates to fishing poles. More particularly, this invention relates to multi-section fishing poles (i.e., poles which comprise a plurality of connecting sections).

BACKGROUND OF THE INVENTION

Conventional multi-section fishing poles or rods normally comprise a plurality of elongated sections which connect together to form a very long pole (e.g., several feet long, when assembled). The base rod section forms the handle for the pole and also supports the mounting of the reel. The outer section of the pole is typically 2 to 3 feet long, depending upon the number of separate sections in the pole and the total length of the pole desired. Each of the sections includes eyelets or guides for the fishing line.

The separate sections of the pole may be hollow or solid and typically include mating openings and shanks which allow the sections to be fitted together in end-to-end fashion. The diameter of the sections typically decreases from the handle end to the outer end.

Although these multi-section poles are very useful, there are instances when their utility is limited. For example, such poles are too long to permit their practical use for ice fishing. Also, when the outer section becomes broken, there isn't sufficient flexibility in the remainder of the pole sections to permit effective use of the pole in normal manner. Further, the use of the completely assembled pole may be limited when fishing in areas where tree limbs or brush or the like obstruct the normal use of the pole.

Prior patents which relate to various types of fishing poles include the following U.S. Pat. Nos.: 1,463,084; 1,527,463; 1,640,350; 1,731,173; 2,632,273; 2,680,923; 2,724,203; 2,874,507; 2,902,789; 3,060,617; 3,121,290; 3,447,254; 3,557,483; 3,778,916; 4,027,419; 4,067,133; and 4,183,163. However, none of such patents describe or suggest viable solutions to the problems described above. U.S. Pat. No. 4,067,133 describes an adaptor kit for a deep sea fishing pole. The adaptor tip is described as having substantially less flexibility than the original extension section of the pole. Consequently, the type of tip described in such patent leads away from the present invention. Furthermore, such prior patents do not describe an effective means for adapting a tip to various different diameter fishing poles.

SUMMARY OF THE INVENTION

In accordance with the present invention there is provided a detachable tip which is readily and easily adapted to convert a conventional fishing rod base or handle section to an ice fishing pole. The tip may also be used as a repair item for a fishing pole if the outer tip section of the fishing pole breaks.

The detachable tip of the invention comprises a resiliently flexible shaft having a length in the range of about 4 to 10 inches. One end of the shaft includes attachment means which is adapted to detachably secure the tip to the base or handle section of the fishing rod or to any other desired section. The opposite end of the shaft includes an eyelet or guide for the fishing line.

Thus, the detachable tip of the invention can be readily attached to any desired rod section (e.g., such as the base section) for ice fishing or for fishing in areas where a very short pole is required. It may also be used as a replacement item if the outer section of a conventional multi-piece pole should break. The defined flexibility and resilience of the tip provides the desired action. The tip of the invention may be adapted to fit any conventional fishing pole and is adaptable to fit various different diameter poles.

The tip section is very flexible and resilient. It is more flexible than the rod section it is replacing. Preferably the tip section is sufficiently flexible that 0.25 ounce of weight applied to the outer end of the tip (when held in a horizontal position) will cause the tip to deflect or bend downwardly at least a few degrees. It is also preferable for the tip section to deflect or bend downwardly 90° (i.e., to a vertical position) with about 1 to 2 pounds of weight (or less) suspended from the outer end thereof. The tip may also be deflected 180° in every direction without breaking. Of course, the tip must spring back to its original horizontal position after the weight is removed.

Other advantages of the invention will be apparent from the following description and the appended drawings.

BRIEF DESCRIPTION OF THE DRAWINGS

The invention is described in more detail hereinafter with reference to the accompanying drawings, wherein like reference characters refer to the sam parts throughout the several views and in which:

FIG. 1 is a perspective view of one embodiment of the invention;

FIG. 2 illustrates the embodiment of detachable tip of FIG. 1 detachably secured to the end of a base or handle section of a conventional fishing pole;

FIG. 3 is a cross-sectional view of the attachment end of the embodiment of detachable tip of the invention shown in FIGS. 1 and 2;

FIG. 4 is a side view of another embodiment of attachment end for the detachable tip of the invention; and FIG. 5 is a cross-sectional view illustrating another version of the attachment means useful in this invention.

DETAILED DESCRIPTION OF THE INVENTION

In FIG. 1 there is shown a perspective view of one embodiment of detachable tip 10 of the invention comprising a flexible and resilient shaft 12. At one end of the shaft there is secured an eyelet 14 (i.e., a guide member for fishing line). At the opposite end there is attachment means comprising a shank 16 which is adapted to be slidably received in the end of a fishing rod section (e.g., the base section) having an opening therein.

This is illustrated in FIG. 2 where detachable tip 10 has been slidably received in an opening at the outer end of base rod section 20. The base section includes handle portion 21 and fishing reel 22. Fishing line 24 passes through guide 23 on rod section 20 and then through eyelet 14 on tip 10. A hook 25 may be attached at the end of the fishing line. When the tip 10 is attached to rod section 20 as illustrated the pole is very useful, for example, for ice fishing or for fishing in areas where a short pole is required.

The shaft of the detachable tip of the invention is flexible and resilient. This means that the shaft is capable of bending or flexing at least 90° (and preferably 180°) in each direction without breaking or cracking and being further capable of returning to its original shape and position when the force is removed. The tip section is much more flexible than the section of rod it is replacing.

Preferably the tip section is sufficiently flexible that it can be deflected at least a few degrees when a weight of 0.25 ounce is attached to the end thereof (when the tip section is held horizontally). The tip section should also deflect 45° in response to a force of about 0.5 to 1.5 pounds (preferably 0.8 pound).

It is also preferable for the tip section to deflect or bend downwardly 90° (i.e., to a vertical position from a horizontal position) with about 1 to 2 pounds (preferably 1.5 pounds) of force applied to the outer end thereof and still be capable of returning to its original position when the force is removed. Even more preferably, the tip section will deflect 135° when a force of 2 to 3 pounds applied to the outer end.

Preferably the tip shaft is made of plastic (e.g., nylon). For example, it may be molded as an integral unit, or it may be a plastic body surrounding a fiber core (e.g., a graphite, glass, or carbon fiber core). A wire or cable core may also be used if the resulting tip is flexible and resilient as defined above. Another useful composition for the shaft is plastic (e.g., nylon) containing fibers (e.g., glass, graphite or carbon) having a length of about 0.2 to 0.5 inch.

The length of the shaft is in the range of about 4 to 10 inches, with a length of about 6 to 8 inches being preferred. The shaft may be tapered slightly from the attachment end to the outer end.

The eyelet may be molded as an integral part of the tip or it may be secured to the outer end of the shaft after the shaft has been manufactured. For example, eyelets or guides are commonly available and may be secured to the shaft with adhesive, etc. When the eyelet is molded as an integral part of the shaft, a ceramic ring is preferably inserted into the eyelet to prevent the fishing line from wearing the eyelet severely.

The attachment means may also be molded as an integral part of the shaft, if desired. Alternatively, the attachment means may be formed separately and then secured to the shaft.

The detachable tips of the invention may be made in any desired colors. The degree of flexibility in the tip is determined by the length of the shaft, the diameter of the shaft, and the composition of the shaft, including type of core member if any therein.

The detachable tips of the invention may be adapted to be attached to fishing pole sections of various diameters. In FIGS. 1 and 3 there is illustrated one type of attachment means 16 which is adjustably expandable and which may be slidably engaged in the open end of a fishing pole section.

The attachment means includes elongated inner shank portion 30 having a rearward threaded section 30A of reduced diameter and a forward section 30B of enlarged diameter. A plurality of sleeve members 34 slidably engage shank 30 loosely. A plurality of elastomeric O-rings 35 also slidably engage shank 30.

The sleeve 32 at the rearward end of the shank includes an end wall with a threaded aperture therein which engages threaded section 30A of shank 30, as illustrated. When sleeve 32 is threaded onto the end of shank 30 it provides a forward force which causes O-rings 35 to become compressed. This causes the O-rings to expand outwardly (i.e., the O-rings are increased in effective outer diameter).

In this manner the effective diameter of the attachment end is increased so that it will closely engage a female section of a fishing pole. For example, the effective diameter of the attachment end can be varied from about 0.15 to 0.30 inch to accommodate appropriately sized fishing pole sections.

The length of the attachment end of the detachable tip may vary. Typically it is about 1 to 1.5 inches in length.

If desired, the ends of the sleeve members 32 and 34 may include a slight recess to enable the adjacent 0-ring to rest therein slightly.

In FIG. 4 there is illustrated another embodiment of attachment means for the detachable tip of the invention in which three differently sized O-rings 36, 37, and 38 are used. The smallest diameter 0-ring is at the rearward or outer end of the attachment means while the largest 0-ring is present at the forward end of the attachment means. By using this arrangement the attachment means is more able to accommodate a large variation in fishing pole section diameters.

FIG. 5 is a cross-sectional view illustrating another variation of the attachment means used in this invention. This embodiment includes a shank 40 which is threaded at its outer end 40A. The forward end 40B is of a larger diameter.

Sleeves 44 slidably engage the shank 40, and O-rings 45 separate the sleeves. The sleeve 42 at the outer end is threaded on its interior surface so as to engage the threaded end 40A of shank 40.

When sleeve 42 is tightened on shank 40 it causes the O-rings to be compressed, thereby increasing the effective diameter of the attachment end. This enables attachment to various sizes of fishing pole sections.

The number of sleeves and O-rings may vary. Typically, the 0-ring comprises a highly compressible, elastomeric rubbery material. Instead of O-rings it is also possible to use an elastomeric sleeve. In other words, the cross-sectional shape of the 0-ring may be square or rectangular as well as circular. Reference herein to "0-ring" is meant to include non-circular and circular cross-sectional configurations for the elastomeric material.

The detachable tips of this invention are very useful for converting an ordinary fishing pole to an ice fishing pole, as described, and they can also be used as repair items for broken tips of fishing poles. The tips can be easily stored and carried in a tackle box or creel. The tips can be made of fiberglass, metal, reinforced plastic, graphite, etc.

Other variants are possible without departing from the scope of the present invention.

What is claimed is:

1. In combination with a conventional fishing rod base section having a fishing reel attached thereto, a tip section detachably mounted to said base section, said tip being adapted to convert said fishing rod base section to an ice fishing pole, wherein said detachable tip comprises a resiliently flexible shaft having first and second ends and a length in the range of about 4 to 10 inches, wherein said first end of said shaft includes attachment means adapted to detachably secure said tip to said fishing rod section, wherein said second end of said shaft includes an eyelet; and wherein said tip is capable of being deflected 180° without breaking; wherein said attachment means comprises:
  (a) an elongated shank having forward and rearward portions; wherein said forward portion is secured to said first end of said flexible shaft; and wherein said rearward portion is threaded;
  (b) a plurality of elastomeric O-rings carried on said shank;
  (c) a plurality of sleeve members slidably engaging said shank adjacent said O-rings; and
  (d) a threaded sleeve member carried by and threadably engaging said rearward portion of said shank.

2. A combination in accordance with claim 1, wherein said shaft has a length of about 4 to 10 inches.

3. A combination in accordance with claim 1, wherein there are three of said O-rings.

4. A combination in accordance with claim 1, wherein said O-rings have the same diameter.

5. A combination in accordance with claim 1, wherein said shaft comprises plastic.

6. A combination in accordance with claim 1, wherein said shaft comprises a fiber core surrounded by plastic.

7. A combination in accordance with claim 1, wherein said shaft comprises plastic and includes fibers having a length in the range of about 0.2 to 0.5 inch.

8. In combination with the base section of a conventional fishing rod having a fishing reel attached thereto, a tip section detachably mounted to said base section, said tip being adapted to convert said fishing rod section to an ice fishing pole, wherein said detachable tip comprises a resiliently flexible plastic shaft having first and second ends and a length in the range of about 4 to 10 inches, wherein said first end of said shaft is adapted to slidably engage said base section and detachably secure said tip to said base section, wherein said second end of said shaft includes an eyelet, wherein said first end of said shaft comprises:
  (a) an elongated shank having forward and rearward portions; wherein said forward portion is secured to said shaft; and wherein said rearward portion is threaded;
  (b) a plurality of elastomeric O-rings carried on said shank;
  (c) a plurality of sleeve members slidably engaging said shank adjacent said O-rings; and
  (d) a threaded sleeve member carried by and threadably engaging said rearward portion of said shank; wherein when said threaded sleeve member is rotated in a manner such that it is advanced toward said forward end of said shank said O-rings become expanded in outer diameter.

9. A combination in accordance with claim 8, wherein there are three of said O-rings.

10. A combination in accordance with claim 8, wherein said O-rings have the same diameter.

11. A combination in accordance with claim 8, wherein said shaft comprises a fiber core.

12. A combination in accordance with claim 8, wherein said plastic shaft includes fibers having a length in the range of about 0.2 to 0.5 inch.

13. A method for converting a fishing rod base section to an ice fishing pole, said method comprising the steps of:
  (a) providing a detachable tip comprising a resiliently flexible shaft having a length in the range of about 4 to 10 inches, wherein one end of said shaft includes attachment means adapted to detachably secure said tip to said base section of said rod, and wherein the opposite end of said shaft includes an eyelet; and wherein said tip is capable of being deflected 180° without breaking; and
  (b) detachably securing said tip to said base section of said rod;
wherein said attachment means comprises:
  (i) an elongated shank having forward and rearward portions; wherein said forward portion is secured to said first end of said flexible shaft; and wherein said rearward portion is threaded
  (ii) a plurality of elastomeric O-rings carried on said shank;
  (iii) a plurality of sleeve members slidably engaging said shank adjacent said O-rings; and
  (iv) a threaded sleeve member carried by and threadably engaging said rearward portion of said shank.

* * * * *